US012744244B2

(12) United States Patent
Hara et al.

(10) Patent No.: US 12,744,244 B2
(45) Date of Patent: Sep. 22, 2026

(54) ALKALI METAL ION-CONDUCTIVE SOLID ELECTROLYTE, METHOD FOR PRODUCING SAME, SEPARATOR FOR NONAQUEOUS ELECTROLYTE SECONDARY BATTERIES, METHOD FOR PRODUCING SAID SEPARATOR FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Kohei Hara, Osaka Fu (JP); Motohiro Sakata, Osaka Fu (JP); Hirotetsu Suzuki, Osaka Fu (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 572 days.

(21) Appl. No.: 18/269,392

(22) PCT Filed: Dec. 22, 2021

(86) PCT No.: PCT/JP2021/047655
§ 371 (c)(1),
(2) Date: Jun. 23, 2023

(87) PCT Pub. No.: WO2022/145318
PCT Pub. Date: Jul. 7, 2022

(65) Prior Publication Data

US 2024/0322232 A1 Sep. 26, 2024

(30) Foreign Application Priority Data

Dec. 28, 2020 (JP) ................................ 2020-219131

(51) Int. Cl.
*H01M 10/0565* (2010.01)
*C08B 15/05* (2006.01)
(Continued)

(52) U.S. Cl.
CPC ......... *H01M 10/0565* (2013.01); *C08B 15/05* (2013.01); *H01M 10/052* (2013.01); *H01M 50/4295* (2021.01); *H01M 2300/0082* (2013.01)

(58) Field of Classification Search
None
See application file for complete search history.

(56) References Cited

U.S. PATENT DOCUMENTS

2013/0183570 A1 7/2013 Yong et al.
2013/0224557 A1 8/2013 Hayakawa et al.
(Continued)

FOREIGN PATENT DOCUMENTS

CN 109690695 A 4/2019
CN 110993861 A 4/2020
(Continued)

OTHER PUBLICATIONS

Office Action dated Aug. 16, 2025, issued in counterpart CN Application No. 202180087749.2, with English translation. (12 pages).

(Continued)

*Primary Examiner* — Carlos Barcena
(74) *Attorney, Agent, or Firm* — WHDA, LLP

(57) ABSTRACT

An alkali metal ion conductive solid electrolyte including an organic polymer having an alkali metal sulfonate group, wherein the alkali metal sulfonate group is a part of an alkali metal alkyl sulfonate group represented by a formula: $—R—SO_3X$ (where R is an alkylene group and X is an alkali metal atom), the organic polymer may be a derivative
(Continued)

of a polysaccharide, and the mass (EW value) of the organic polymer per 1 mol of the alkali metal sulfonate group is 168 g/mol or more and 300 g/mol or less.

12 Claims, 1 Drawing Sheet

(51) Int. Cl.

*H01M 10/052* (2010.01)
*H01M 50/429* (2021.01)

(56) References Cited

U.S. PATENT DOCUMENTS

| | | | | |
|---|---|---|---|---|
| 2014/0011080 | A1 | 1/2014 | Lee et al. | |
| 2014/0227607 | A1* | 8/2014 | Pirk | H01M 10/0565 429/308 |
| 2015/0010798 | A1 | 1/2015 | Sawai et al. | |
| 2020/0203746 | A1 | 6/2020 | Inoue et al. | |
| 2021/0273252 | A1 | 9/2021 | Ito et al. | |

FOREIGN PATENT DOCUMENTS

| | | | |
|---|---|---|---|
| EP | 1371639 | A2 | 12/2003 |
| JP | 1-95101 | A | 4/1989 |
| JP | H10-208544 | A | 8/1998 |
| JP | 11-7936 | A | 1/1999 |
| JP | 2000-243450 | A | 9/2000 |
| JP | 2009-059514 | A | 3/2009 |
| JP | 2010-218742 | A | 9/2010 |
| JP | 2013-229325 | A | 11/2013 |
| JP | 2017-068900 | A | 4/2017 |
| KR | 10-2014-0005079 | A | 1/2014 |
| KR | 101827728 | B1 | 2/2018 |
| KR | 10-2018-0107544 | A | 10/2018 |
| KR | 102192730 | B1 | 12/2020 |
| WO | 2012/056890 | A1 | 5/2012 |
| WO | 2012/154750 | A2 | 11/2012 |
| WO | 2013/128652 | A1 | 9/2013 |
| WO | 2020/136947 | A1 | 7/2020 |

OTHER PUBLICATIONS

International Search Report dated Mar. 8, 2022, issued in counterpart International Application No. PCT/JP2021/047655 (3 pages).

Office Action dated May 23, 2024, issued in counterpart CN application No. 202180087749.2, with partial English translation. (13 pages).

The partial supplementary European Search Report dated Oct. 1, 2024, issued in counterpart Application No. 21915178.4. (18 pages).

Oh Hyukkeun et al., Poly (arylene ether) based Single-Ion Conductors for Lithium-Ion Batteries, Chemistry of Materials, vol. 28, No. 1, Jan. 12, 2016, pp. 188-196; Cited in the partial supplementary European Search Report dated Oct. 1, 2024. (6 pages).

Guhathakurta, S et al., Lithium sulfonate promoted compatibilization in single ion conducting solid polymer electrolytes based on lithium salt of sulfonated polysulfone and polyether epoxy, Polymer, vol. 51, No. 1, Jan. 6, 2010, pp. 211-221; Cited in the partial supplementary European Search Report dated Oct. 1, 2024. (11 pages).

Gao Jing et al., Lithiated Nafion as polymer electrolyte for solid-state lithium sulfur batteries using carbon-sulfur composite cathode, Journal of Power Sources, vol. 382, Mar. 8, 2018, pp. 179-189; Cited in the partial supplementary European Search Report dated Oct. 1, 2024. (11 pages).

Office Action dated Dec. 5, 2024, issued in counterpart CN Application No. 202180087749.2. (7 pages).

Extended (Supplementary) European Search Report dated Jan. 17, 2025, issued in counterpart EP Application No. 21915178.4. (16 pages).

Office Action dated Jan. 6, 2026, issued in counterpart JP Application No. 2022-573029. (8 pages).

Office Action dated Jun. 2, 2026, issued in counterpart JP Application No. 2022-573029. (6 pages).

* cited by examiner

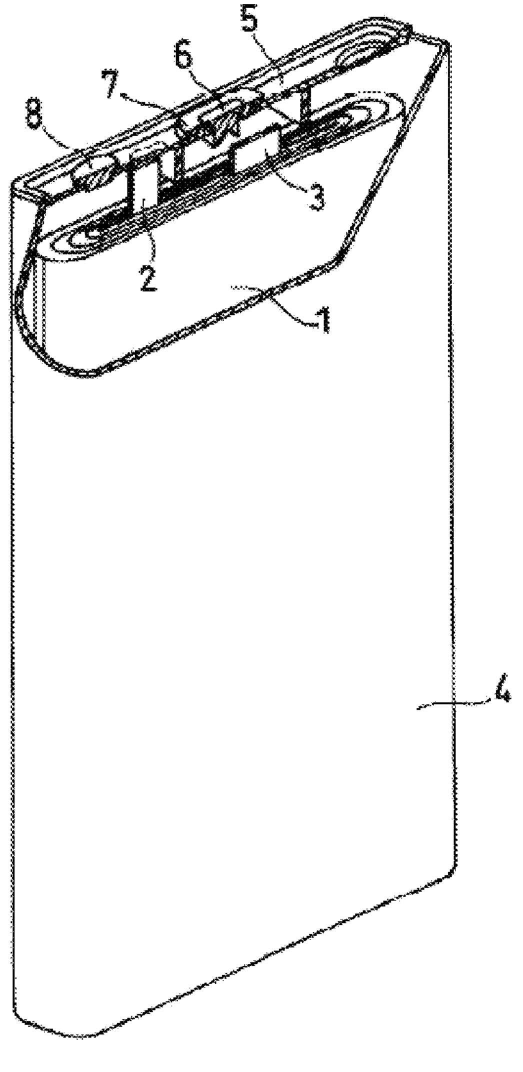
5
6
7
8
3
2
1
4

ALKALI METAL ION-CONDUCTIVE SOLID ELECTROLYTE, METHOD FOR PRODUCING SAME, SEPARATOR FOR NONAQUEOUS ELECTROLYTE SECONDARY BATTERIES, METHOD FOR PRODUCING SAID SEPARATOR FOR NONAQUEOUS ELECTROLYTE SECONDARY BATTERIES, AND NONAQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/047655 filed on Dec. 22, 2021 which claims the benefit of priority under 35 U.S.C. § 119 (a) of Japanese Patent Application No. 2020-219131 filed on Dec. 28, 2020 in Japan, the contents of which are incorporated herein by reference.

TECHNICAL FIELD

The present invention relates mainly to an alkali metal ion conductive solid electrolyte used for a material of a non-aqueous electrolyte secondary battery.

BACKGROUND ART

Patent Literature 1 has proposed a liquid holder for a lithium secondary battery, which is used for a secondary battery. The liquid holder as a separator is interposed between a positive electrode plate and a negative electrode plate, and they are wound or laminated to form an electrode group. The electrode group is immersed in or impregnated with an organic electrolyte, wherein lithium ions are stored and released repeatedly. The liquid holder is a multilayer structure having at least two hydrophilic fiber layers having different porosities, the fiber layer at the interface side with the negative electrode plate has a porosity smaller than the porosity of the fiber layer at the interface side with the positive electrode plate, and the average porosity in the fiber layers as a whole is 50% or more.

Patent Literature 2 has proposed a solid polymer electrolyte membrane composed of sulfoalkyl cellulose produced by sulfoalkylation of cellulose, wherein the membrane is crosslinked by a cross-linking agent. Patent Literature 2 also has proposed using the solid polymer electrolyte membrane for a fuel cell.

CITATION LIST

Patent Literature

PLT1: WO 2013/128652

PLT2: Japanese Unexamined Patent Publication No. 2010-218742

SUMMARY OF INVENTION

Solution to Problem

In the field of non-aqueous electrolyte secondary batteries, an attempt has been made to separate the positive electrode from the negative electrode and also secure lithium ion conduction between them. By separating the positive electrode from the negative electrode, migration of eluted products or by-products from one to another is restricted, which is expected to suppress side reactions. Also, an electrolyte having a different composition suitable for a positive electrode side and a negative electrode side can be used, allowing improvement in battery durability and output characteristics.

The liquid holder for a lithium secondary battery of Patent Literature 1 is formed of a fiber layer, and therefore it does not limit migration of materials other than lithium ions between the positive electrode and the negative electrode.

The solid polymer electrolyte membrane of Patent Literature 2 has proton conductivity, but has no lithium ion conductivity, and cannot be applied to non-aqueous electrolyte secondary batteries.

Means for Solving the Problem

An aspect of the present invention relates to an alkali metal ion conductive solid electrolyte including an organic polymer having an alkali metal sulfonate group.

Another aspect of the present invention relates to a separator for a non-aqueous electrolyte secondary battery including the above-described alkali metal ion conductive solid electrolyte.

Still another aspect of the present invention relates to a non-aqueous electrolyte secondary battery including a positive electrode, a negative electrode, the above-described separator for a non-aqueous electrolyte secondary battery interposed between the positive electrode and the negative electrode, a first electrolyte in contact with the positive electrode, a second electrolyte in contact with the negative electrode, and the first electrolyte has a different composition from that of the second electrolyte.

Still another aspect of the present invention relates to a non-aqueous electrolyte secondary battery including a positive electrode, a negative electrode, a separator interposed between the positive electrode and the negative electrode, and an electrolyte in contact with the positive electrode and the negative electrode, wherein at least one of the positive electrode and the negative electrode includes the above-described alkali metal ion conductive solid electrolyte.

Still another aspect of the present invention relates to a method for producing an alkali metal ion conductive solid electrolyte, the method including a step of adding a halogenated alkyl sulfonate to an alkaline solution including a raw material organic polymer having a plurality of hydroxyl groups, to replace at least one hydrogen atom of the hydroxyl group with an alkyl sulfonate group represented by a formula: $—R—SO_3X$ (where R is an alkylene group and X is an alkali metal atom).

Still another aspect of the present invention relates to a method for producing a separator for a non-aqueous electrolyte secondary battery, the method including a step of forming the above-described alkali metal ion conductive solid electrolyte into a sheet.

Effects of Invention

The alkali metal ion conductive solid electrolyte of the present invention allows for separation of the positive electrode from the negative electrode, and securing of alkali metal ion conductivity therebetween.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

The FIGURE is a partially cutaway oblique view showing a configuration of a non-aqueous electrolyte secondary battery in an embodiment of the present invention.

DESCRIPTION OF EMBODIMENTS

[Alkali Metal Ion Conductive Solid Electrolyte]

The alkali metal ion conductive solid electrolyte in an embodiment of the present invention includes an organic polymer having an alkali metal sulfonate group (e.g., lithium sulfonate group) (hereinafter, referred to as LSP). The LSP can be easily synthesized by, for example, introducing an alkali metal sulfonate group into a raw material organic polymer, or introducing a sulfo group (—$SO_3H$) and then replacing the hydrogen atom with an alkali metal such as Li, Na, and K. The alkali metal sulfonate group (—$SO_3X$: X is an alkali metal atom) serves to conduct alkali metal ion hopping, and impart alkali metal ion conductivity to the organic polymer.

To the raw material organic polymer, a sulfonate group or a sulfo group may be introduced. For example, the raw material organic polymer may have a plurality of hydroxyl groups. The hydroxyl group may be replaced with a sulfo group or a sulfonate group, or a substituent having these by various methods.

The mass of the organic polymer (EW value) per 1 mol of the alkali metal sulfonate group may be 168 g/mol or more and 300 g/mol or less. The smaller the EW value, the more excellent the alkali metal ion conductivity. To obtain an LSP with a small EW value, a raw material organic polymer having many hydroxyl groups as much as possible can be used. For the raw material organic polymer, a polysaccharide may be used. The LSP synthesized from a polysaccharide is a derivative of the polysaccharide.

The polysaccharide is a general term for a polymer having a structure in which a plurality of monosaccharide molecules are bonded through a glycosidic bond. Examples of a basic structure of the polysaccharide that can be used include aldose, ketose, pyranose, and furanose. Examples of monosaccharide molecules (monomer) that constitute the polysaccharide include triose, tetrose, pentose, hexose, and heptose. In particular, aldopentose, ketopentose, aldohexose, and ketohexose are preferable. Specific examples of the polysaccharide include cellulose, hemicellulose, pectin, alginic acid, pullulan, mannan, xanthan gum, guar gum, starch, glycogen, chitin, dextran, agarose, carrageenan, heparin, hyaluronic acid, glucomannan, and a derivative (salt, ester product, ether product, amide product, etc.) thereof. In particular, cellulose has excellent heat resistance, is abundantly available, and is available for a low cost.

The LSP may further have a plurality of hydroxyl groups derived from the raw material organic polymer. The hydrogen atom of the hydroxyl group can be replaced with an alkali metal atom. In this manner, the alkali metal ion conductivity of the LSP can be further improved.

The alkali metal sulfonate group may be a part of an alkali metal alkyl sulfonate group represented by a formula: —R—$SO_3X$ (where R is an alkylene group and X is an alkali metal atom). Here, the alkylene group R may be, for example, an alkylene group having a carbon number of 1 or more and 10 or less. The alkylene group R may be, for example, a methylene group, ethylene group, n-propylene group, n-butylene group, n-pentylene group, and n-hexylene group.

[Separator for Non-Aqueous Electrolyte Secondary Battery]

The LSP can be formed into a sheet to produce a separator for a non-aqueous electrolyte secondary battery. For the separator, generally, a microporous film, paper, and nonwoven fabric are used. However, to separate the positive electrode from the negative electrode, a dense membrane is necessary. The dense membrane including the LSP can be used as a separator that separates the positive electrode from the negative electrode, and allows for alkali metal ion conduction therebetween.

For example, by using a solution in which the LSP is dissolved in a solvent, a dense membrane including the LSP can be produced. The LSP having an alkali metal sulfonate group is water-soluble. The aqueous solution including the LSP can be formed into a dense membrane by various methods. For example, an aqueous solution including the LSP can be applied to a flat surface of a substrate sheet, and water is evaporated from the applied film to produce a dense membrane.

The separator may be nonporous. Nonporous means, unlike general separators, having no pore or gap that allows for migration of electrolytes. However, nonporous means nonporous in a substantial manner, and a presence of pinholes formed inevitably is allowed.

The nonporous separator has a high air permeance. The separator may have an air permeance (air resistance) of, for example, 10000 see/100 mL or more. The air permeance can be measured by, for example, a type B tester (Gurley type densometer) in accordance with "21.2 air permeance method B (Gurley testing method)" (JIS P 8117) of JIS C2300.

The dense membrane including the LSP may be, for example, a film containing 70 mass % or more of LSP, or a film containing 95 mass % or more of LSP, or may be of 100% LSP. The dense membrane including the LSP may have a thickness of, for example, 0.001 μm or more and 100 μm or less, 0.01 jam or more and 90 un or less, 0.1 μm or more and 80 μm or less, or 1 μm or more and 70 μm or less.

In particular, among the LSPs, a dense membrane including an organic polymer having a lithium sulfonate group shows, for example, at 25° C., for example, $1.0\times10^{-4}$ S/cm or more, even more $1.0\times10^{-3}$ S/cm or more (or $2.0\times10^{-3}$ S/cm or more) of ion conductivity (e.g., lithium ion conductivity). When a general cellulose is formed into a dense membrane, the film has an ion conductivity of $10^{-8}$ S/cm or less.

[Method for Producing LSP]

In the following, a method for producing an LSP is further described. However, the method below is an example, and other various methods can be used to synthesize the LSP.

(i) First, a raw material organic polymer (e.g., polysaccharide) and an organic solvent are prepared, and an alkali is dissolved in the organic solvent, and the raw material organic polymer is dissolved or dispersed in the organic solvent to prepare a reaction liquid. An organic solvent that can dissolve the alkali will suffice, and for example, a protonic solvent such as alcohol, ether, ester, and the like can be used. For the alkali. NaOH, KOH, LiOH can be used, without particular limitation.

(ii) Next, to the reaction liquid under stirring, a halogenated alkyl sulfonate is added to replace at least one hydrogen atom of the hydroxyl group of the raw material organic polymer with an alkyl sulfonate group represented by a formula: —R—$SO_3X$ (where R is an alkylene group and X is an alkali metal atom). For the halogenated alkyl sulfonate, for example, bromoalkyl sulfonate can be used. Specifically, sodium 2-bromoethane sulfonate, potassium 2-bromoethane sulfonate, and lithium 2-bromoethane sulfonate can be used. The reaction liquid can be heated to accelerate the replacement reaction. The temperature of the reaction liquid may be, for example, 50° C. to 80° C. The reaction time is not particularly limited, and for example, it may take 10 hours or more (preferably 50 hours to 100 hours) to sufficiently progress the reaction.

(iii) Next, the organic polymer to which the alkyl sulfonate group ($—R—SO_3X$) is introduced is subjected to vacuum filtration, and dried.

When the alkali metal atom X is an atom other than Li (Na, K, etc.), the alkali metal atom X may be exchanged with an Li ion. The organic polymer to which the alkyl sulfonate group is introduced is water-soluble. By dissolving the water-soluble polymer in water to prepare an aqueous solution, and allowing the aqueous solution to contact a strongly acidic ion exchange resin, the alkali metal atom is replaced with a hydrogen atom, and an organic polymer having a sulfoalkyl group is obtained. Then, by adding lithium hydroxide (LiOH) to the acidic aqueous solution to neutralize, the hydrogen atom of the sulfo group is replaced with Li, to generate an LSP having a lithium alkyl sulfonate group.

[Non-Aqueous Electrolyte Secondary Battery]

First Embodiment

A non-aqueous electrolyte secondary battery of this embodiment includes a positive electrode, a negative electrode, a separator including an LSP and disposed between the positive electrode and the negative electrode, and an electrolyte in contact with the positive electrode and the negative electrode. By using the separator including an LSP, migration of eluted products or by-products from one of the positive electrode and the negative electrode to the other is restricted, and side reactions are suppressed. Thus, durability and output characteristics of batteries can be improved.

The separator including an LSP can be used in combination with a general microporous film, paper, nonwoven fabric and the like (hereinafter, also referred to as a conventional separator). For example, the separator including an LSP and a conventional separator can be placed on top of another and used. Also, by applying an aqueous solution including an LSP on one or both surfaces of the conventional separator, and volatilizing water from the coating film, a composite separator of a conventional separator and an LSP can be formed.

In an exemplary structure of a non-aqueous electrolyte secondary battery, a positive electrode and a negative electrode are wound with a separator interposed therebetween to form an electrode group, and the electrode group is accommodated along with an electrolyte in an outer case. However, the structure is not limited thereto, and other forms of electrode groups may be used. For example, it can be a laminate electrode group, in which a positive electrode and a negative electrode are laminated with a separator interposed therebetween. The non-aqueous electrolyte secondary batteries may be of any form, for example, a cylindrical type, prismatic type, coin type, button type, laminated type, etc.

Second Embodiment

A non-aqueous electrolyte secondary battery of this embodiment includes a positive electrode, a negative electrode, a separator including an LSP and disposed between the positive electrode and the negative electrode, a first electrolyte in contact with the positive electrode, and a second electrolyte in contact with the negative electrode. The composition of the first electrolyte is different from that of the second electrolyte.

The first electrolyte has a composition suitable for the positive electrode, and the second electrolyte has a composition suitable for a negative electrode. For example, the first electrolyte has a composition excellent in oxidation resistance, and the second electrolyte has a composition excellent in reduction resistance. By using the separator including an LSP, migration of eluted products or by-products from one of the positive electrode and the negative electrode to the other is restricted, and side reactions are suppressed, and also migration of the first electrolyte to the negative electrode side, and migration of the second electrolyte to the positive electrode side can be suppressed. Thus, durability and output characteristics of batteries can be further improved.

In the case of a wound battery, for example, the positive electrode is impregnated with the first electrolyte, and the negative electrode is impregnated with the second electrolyte, and thereafter, the positive electrode and the negative electrode are wound with the separator including an LSP interposed therebetween to form an electrode group.

The space accommodating the positive electrode can be separated from the space accommodating the negative electrode. Such a structure can be, for example, an inside-out structure. The inside-out structure battery has a cylindrical (columnar) positive electrode and a cylindrical negative electrode. One of the cylindrical positive electrode and the cylindrical negative electrode is inserted into the other. The inside-out structure includes an alkaline dry battery type, and a spike type, without limitation.

Third Embodiment

A non-aqueous electrolyte secondary battery of this embodiment includes a positive electrode, a negative electrode, and a separator including an LSP and disposed between the positive electrode and the negative electrode, and an electrolyte in contact with the positive electrode and the negative electrode, wherein at least one of the positive electrode and the negative electrode includes an LSP.

For example, the LSP can be included in at least one of the positive electrode mixture included in the positive electrode and the negative electrode mixture included in the negative electrode. Also, at least a portion of the surface of the particles of the positive electrode active material included in the positive electrode mixture can be covered with the LSP in advance, or at least a portion of the surface of the negative electrode active material included in the negative electrode mixture can be covered with the LSP in advance. Furthermore, an LSP membrane can be formed on the positive electrode surface, or an LSP membrane can be formed on the negative electrode surface. In this manner, side reactions in the positive electrode or the negative electrode can be suppressed.

In the following, a structure of a prismatic non-aqueous electrolyte secondary battery (lithium secondary battery, lithium ion secondary battery) is described as an example with reference to the FIGURE.

The battery includes a bottomed prismatic battery case 4, an electrode group 1 and a non-aqueous electrolyte (not shown) accommodated in the battery case 4. The electrode group 1 has a negative electrode in the form of a long strip, a positive electrode in the form of a long strip, and a separator interposed therebetween. A negative electrode current collector of the negative electrode is electrically connected to a negative electrode terminal 6 provided in a sealing plate 5 with a negative electrode lead 3. The negative electrode terminal 6 is insulated from the sealing plate 5 with a resin gasket 7. A positive electrode current collector of the positive electrode is electrically connected to a rear face of the sealing plate 5 through a positive electrode lead 2. That is, the positive electrode is electrically connected to the battery case 4 also serving as a positive electrode terminal. The periphery of the sealing plate 5 is fitted to an open end of the battery case 4, and the fitting portion is laser welded. An injection hole for the non-aqueous electrolyte is provided in the sealing plate 5 and is plugged with a sealing plug 8 after the injection.

[Negative Electrode]

In the case of a lithium secondary battery that exhibits, for example, 70% or more of the rated capacity from deposition and dissolution of lithium metal, the negative electrode may have a negative electrode current collector. In the case of a lithium secondary battery, electron migration in the negative electrode during charging and during discharging is mainly due to deposition and dissolution of lithium metal in the negative electrode. Specifically, 70 to 100% (e.g., 80 to 100% or 90 to 100%) of electron migration (electric current in another aspect) during charging and during discharging in the negative electrode is due to lithium metal deposition and dissolution.

The negative electrode may include a negative electrode current collector, and a negative electrode mixture layer supported on a surface of the negative electrode current collector. The negative electrode mixture layer can be formed by applying a negative electrode slurry in which the negative electrode mixture is dispersed in a dispersion medium on a surface of the negative electrode current collector and drying the slurry. The dried coating film may be rolled, if necessary. The negative electrode mixture layer may be formed on one surface of the negative electrode current collector, or on both surfaces thereof.

The negative electrode mixture contains a negative electrode active material as an essential component, and may contain a binder, conductive agent, thickener, and the like as optional components. For the negative electrode active material, the above-described negative electrode material (composite particles having a conductive layer) is used.

As the negative electrode active material, carbon materials that can be exemplified as a material having a graphite type crystal structure capable of reversibly storing and releasing lithium ions such as natural graphite or artificial graphite, non-graphitizable carbon (hard carbon), and graphitizable carbon (soft carbon); a Si-containing material; and a Sn-containing material, and the like. The negative electrode may include one type of negative electrode active material, or two or more types can be used in combination. Preferably, of those examples of the negative electrode active material, a carbon material, and a Si-containing material are used. The carbon material can be combined with the Si-containing material.

As the negative electrode current collector, a non-porous conductive substrate (metal foil, etc.), and a porous conductive substrate (mesh-body, net-body, punched sheet, etc.) are used. For the material of the negative electrode current collector, stainless steel, nickel, nickel alloy, copper, copper alloy or the like can be exemplified. The thickness of the negative electrode current collector is not particularly limited, but in view of balance between strength and weight reduction of the negative electrode, 1 to 50 μm is preferable, and 5 to 20 μm is more preferable.

For the negative electrode active material, for example, a known material capable of storing and releasing lithium ions are used. Examples of the negative electrode active material include a simple substance of metal lithium, lithium alloy, silicon, silicon alloy, graphite, non-graphitizable carbon, and lithium-containing metal oxide.

Examples of the binder include resin materials including fluorine resin such as, for example, polytetrafluoroethylene and polyvinylidene fluoride (PVDF): polyolefin resin such as polyethylene and polypropylene; polyamide resin such as aramid resin; polyimide resin such as polyimide and polyamide-imide; acrylic resin such as polyacrylic acid, polymethyl acrylate, and ethylene-acrylic acid copolymer; vinyl resin such as polyacrylonitrile and polyvinyl acetate; polyvinyl pyrrolidone; polyether sulfone; and rubber materials such as styrene-butadiene copolymer rubber (SBR). The binder may be used singly or in combination of two or more kinds.

Examples of the conductive agent include carbon such as acetylene black; conductive fibers such as carbon fiber and metal fiber; fluorinated carbon; powders of metal such as aluminum; conductive whiskers, such as zinc oxide and potassium titanate; conductive metal oxides such as titanium oxide; and organic conductive material such as phenylene derivatives. The conductive agent may be used singly or in combination of two or more kinds.

Examples of the thickener include carboxymethyl cellulose (CMC) and a modified product thereof (including salt such as Na salt), cellulose derivatives such as methyl cellulose (cellulose ether etc.); a saponified product of a polymer having a vinyl acetate unit such as polyvinyl alcohol; and polyether (polyalkylene oxide such as polyethylene oxide etc.). The thickener may be used singly or in combination of two or more kinds.

The dispersion medium is not particularly limited, and examples thereof include water, an alcohol such as ethanol, ether such as tetrahydrofuran, an amide such as dimethylformamide, N-methyl-2-pyrrolidone (NMP), or a mixture solvent thereof.

[Positive Electrode]

The positive electrode may include a positive electrode current collector, and a positive electrode mixture layer supported on a surface of the positive electrode current collector. The positive electrode mixture layer can be formed by applying a positive electrode slurry in which the positive electrode mixture is dispersed in a dispersion medium on a surface of the positive electrode current collector, and drying the slurry. The dried coating film may be rolled, if necessary. The positive electrode mixture layer may be formed on one surface of the positive electrode current collector, or on both surfaces thereof. The positive electrode mixture may contain a positive electrode active material as an essential component, and may contain a binder and a conductive agent as optional components. For the dispersion medium of the positive electrode slurry, NMP and the like are used.

For the positive electrode active material, for example, a lithium-containing composite oxide can be used. For example, $Li_aCoO_2$, $Li_aNiO_2$, $Li_aMnO_2$, $Li_aCo_bNi_{1-b}O_2$, $Li_aCo_bMe_{1-b}O_c$, $Li_aNi_{1-b}Me_bO_c$, $Li_aMn_2O_4$, $Li_aMn_{2-b}Me_bO_4$, $LiMePO_4$, and $Li_2MePO_4F$ (Me is at least one selected from the group consisting of Na, Mg, Sc, Y, Mn, Fe, Co, Ni, Cu, Zn, Al, Cr, Pb, Sb, B) are used. Here, a=0 to 1.2, b=0 to 0.9, and c=2.0 to 2.3. Note that the value "a" indicating the molar ratio of lithium is increased or decreased by charging and discharging.

In particular, a lithium nickel composite oxide represented by $Li_aNi_bMe_{1-b}O_2$ (Me is at least one selected from the group consisting of Mn, Co, and Al, 0<a≤1.2, and 0.3≤b≤1) is preferable. In view of increasing the capacity, it is more preferable to satisfy 0.85≤b<1. Preferably, in view of stability of the crystal structure, $Li_aNi_bCo_cAl_dO_2$ (0<a≤1.2, 0.85≤b<1, 0<c<0.15, 0<d≤0.1, b+c+d=1) including Co and Al as Me is further preferable.

As the binder and the conductive agent, those exemplified for the negative electrode can be used. As the conductive agent, graphite such as natural graphite or artificial graphite may be used.

The shape and thickness of the positive electrode current collector can be selected from the shapes and ranges according to the negative electrode current collector. Examples of the material of the positive electrode current collector may be stainless steel, aluminum, aluminum alloy, and titanium.

[Electrolyte]

The electrolyte includes a non-aqueous solvent and a lithium salt dissolved in the non-aqueous solvent. Preferably, the electrolyte has a lithium salt concentration of, for example, 0.5 mol/L or more and 2 mol/L or less. By adjusting the lithium salt concentration within the above-described range, an electrolyte with excellent ion conductivity and suitable viscosity can be produced. However, the lithium salt concentration is not limited to the above-described concentration.

As the non-aqueous solvent, for example, cyclic carbonates, chain carbonates, cyclic carboxylates, chain carboxylates, or the like is used. Examples of the cyclic carbonates include propylene carbonate (PC), ethylene carbonate (EC), and the like. Examples of the chain carbonates include diethyl carbonate (DEC), ethyl methyl carbonate (EMC), dimethyl carbonate (DMC), and the like. Examples of the cyclic carboxylates include γ-butyrolactone (GBL) and γ-valerolactone (GVL). Examples of the chain carboxylates include methyl formate, ethyl formate, propyl formate, methyl acetate, ethyl acetate, propyl acetate, methyl propionate, ethyl propionate, and propyl propionate. The non-aqueous solvent may be used singly or in combination of two or more kinds.

Examples of the lithium salt include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, boric acid salts, and imide salts. Examples of the boric acid salts include lithium bisoxalate borate, lithium difluorooxalate borate, lithium bis(1,2-benzene diolate (2-)-O,O') borate, lithium bis(2,3-naphthalene diolate (2-)-O,O') borate, lithium bis(2,2'-biphenyl diolate (2-)-O,O') borate, and lithium bis(5-fluoro-2-olate-1-benzene sulfonic acid-O,O') borate. Examples of the imide salts include lithium bisfluorosulfonylimide ($LiN(FSO_2)_2$), lithium bis (trifluoromethanesulfonyl) imide ($LIN(CF_3SO_2)_2$), lithium trifluoromethanesulfonyl nonafluorobutanesulfonyl imide ($LiN(CF_3SO_2)(C_4F_9SO_2)$), and lithium bis(pentafluoroethanesulfonyl) imide ($LiN(C_2F_5SO_2)_2$). In particular, $LiPF_6$ is preferable. The lithium salt may be used singly or in combination of two or more kinds.

The present invention will be more specifically described below with reference to Examples and Comparative Examples; however, the present invention is not limited to Examples below.

Example 1

[LSP Preparation]

One g of α-cellulose that is a polysaccharide as a raw material organic polymer, 14 mL of 1-propanol, and 4 mL of an aqueous KOH solution with a concentration of 10 mol/L were mixed to prepare a reaction liquid, and the reaction liquid was stirred for 1 hour.

To the reaction liquid, 3.904 g of sodium 2-bromoethane sulfonate ($Bt-CH_2CH_2—SO_3Na$) was added, and thereafter, the reaction liquid was stirred at 70° C. for 70 hours, thereby replacing a portion of hydrogen atoms of the hydroxyl group of the raw material organic polymer with a potassium ethylsulfonate group (or a sodium ethyl sulfonate group) represented by a formula: $—CH_2CH_2SO_3K$(or $—CH_2CH_2SO_3Na$).

Then, the cellulose (SEC-K) to which the potassium ethyl sulfonate group (or a sodium ethyl sulfonate group) was introduced was subjected to vacuum filtration with a polytetrafluoroethylene-made membrane filter with a micropore diameter of 0.1 μm, washed with an aqueous methanol solution with a concentration of 70 mass %, and then further washed with methanol, and the washed SEC-K was naturally dried for 24 hours. Afterwards, the SEC-K was dried under vacuum at 105° C. for 10 hours.

Then, the obtained SEC-K was dissolved in water to prepare an aqueous solution, and the aqueous solution was allowed to contact a strongly acidic ion exchange resin, thereby producing a cellulose having a sulfoethyl group. Then, to the acidic aqueous solution of cellulose having the sulfoethyl group, IM of an aqueous LiOH solution was added to neutralize, replacing the hydrogen atom of the sulfoethyl group to Li, thereby producing an LSP having lithium ion conductivity with a structure of the formula below as an example.

[Chem 1]

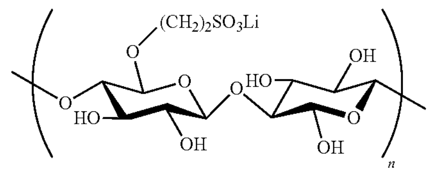

[Li Ion Conductivity Evaluation]

The aqueous solution including an LSP was casted to a flat PFA-made petri dish, and water was volatilized from the coating film, thereby producing a nonporous dense membrane having a thickness of 100 μm. The produced membrane (LSP membrane) was punched into a circle with a diameter of 12 mm, and sandwiched with a pair of stainless steel-made electrode, and its ion conductivity was measured by an AC impedance method under conditions of a frequency of 7 MHz to 100 mMHz and an amplitude of 10 mV at 25° C., 40° C., and 60° C. Table 1 shows the results.

TABLE 1

| Temperature | Ion conductivity (S/cm) |
|---|---|
| 60° C. | $7.1 \times 10^{-3}$ |
| 40° C. | $4.5 \times 10^{-3}$ |
| 25° C. | $2.9 \times 10^{-3}$ |

The air permeance of the LSP membrane was measured by the described method, and the air permeance was 10000 sec/100 mL or more.

Separately, a nonporous dense cellulose film with a thickness of 17 μm was prepared, and the produced film was punched out into a circle with a diameter of 12 cm, and the ion conductivity was measured in the same manner as described above, and it was found that it had no ion conductivity.

INDUSTRIAL APPLICABILITY

The alkali metal ion conductive solid electrolyte of the present invention is suitable for a material of a non-aqueous electrolyte secondary battery.

While the novel features of the invention are set forth particularly in the appended claims, the invention, both as to organization and content, will be better understood and appreciated, along with other objects and features thereof, from the following detailed description taken in conjunction with the drawings.

REFERENCE SIGNS LIST

1: electrode group, 2: positive electrode lead, 3: negative electrode lead, 4: battery case, 5: sealing plate, 6: negative electrode terminal, 7: gasket, 8: sealing plug

The invention claimed is:

1. A non-aqueous electrolyte secondary battery comprising:

a positive electrode, a negative electrode, a non-aqueous electrolyte, and an alkali metal ion conductive solid electrolyte, wherein the non-aqueous electrolyte includes a non-aqueous electrolyte and a lithium salt dissolved in the non-aqueous electrolyte, the alkali metal ion conductive solid electrolyte comprising an organic polymer having a lithium sulfonate group, and a mass (EW value) of the organic polymer per 1 mol of the lithium sulfonate group is 168 g/mol or more and 300 g/mol or less.

2. The non-aqueous electrolyte secondary battery of claim 1, wherein the lithium sulfonate group is a part of lithium alkyl sulfonate group represented by a formula: —R—$SO_3Li$ (where R is an alkylene group).

3. The non-aqueous electrolyte secondary battery of claim 1, wherein the organic polymer further has a plurality of hydroxyl groups.

4. The non-aqueous electrolyte secondary battery of claim 1, wherein the organic polymer is a derivative of a polysaccharide.

5. The non-aqueous electrolyte secondary battery of claim 1, wherein the alkali metal ion conductive solid electrolyte is included in at least one of the positive electrode and the negative electrode.

6. A nonporous separator for a non-aqueous electrolyte secondary battery including an alkali metal ion conductive solid electrolyte comprising an organic polymer having an alkali metal ion sulfonate group.

7. A non-aqueous electrolyte secondary battery comprising a positive electrode, a negative electrode, the separator for a non-aqueous electrolyte secondary battery of claim 6 interposed between the positive electrode and the negative electrode, a first electrolyte in contact with the positive electrode, and a second electrolyte in contact with the negative electrode, wherein the first electrolyte has a different composition from that of the second electrolyte.

8. A method for producing an alkali metal ion conductive solid electrolyte, the method including a step of adding a halogenated alkyl sulfonate to an alkaline solution including a raw material organic polymer having a plurality of hydroxyl groups, to replace at least one hydrogen atom of the hydroxyl group with an alkyl sulfonate group represented by a formula: —R—$SO_3X$ (where R is an alkylene group and X is an alkali metal atom), and further including a step of exchanging the alkali metal atom X with an Li ion.

9. The method for producing an alkali metal ion conductive solid electrolyte of claim 8, wherein the halogenated alkyl sulfonate is bromoalkylsulfonate.

10. The method for producing an alkali metal ion conductive solid electrolyte of claim 8, wherein the alkali metal atom X is K or Na.

11. The method for producing an alkali metal ion conductive solid electrolyte of claim 8, wherein the alkaline solution is a dispersion liquid in which the raw material organic polymer is dispersed in an organic solvent.

12. The method for producing an alkali metal ion conductive solid electrolyte of claim 8 further including a step of forming the alkali metal ion conductive solid electrolyte into a sheet.

* * * * *